United States Patent [19]

Hayashi et al.

[11] Patent Number: 4,914,293

[45] Date of Patent: Apr. 3, 1990

[54] MICROSCOPE APPARATUS

[75] Inventors: Masakazu Hayashi, Yokohama; Fumihiko Ishida, Kawasaki; Junzou Utida, Fuji, all of Japan

[73] Assignee: Kabushiki Kaisha Toshiba, Kawasaki, Japan

[21] Appl. No.: 317,465

[22] Filed: Mar. 1, 1989

[30] Foreign Application Priority Data

Mar. 4, 1988 [JP] Japan ................................. 63-50891
Aug. 29, 1988 [JP] Japan ............................. 63-214104

[51] Int. Cl.⁴ ............................................ H01J 37/00
[52] U.S. Cl. .................................... 250/306; 350/507
[58] Field of Search ........................ 250/306, 423 F; 350/507

[56] References Cited

U.S. PATENT DOCUMENTS

| | | | |
|---|---|---|---|
| 4,343,993 | 8/1982 | Binning et al. | 250/306 |
| 4,762,405 | 8/1988 | Imoue et al. | 350/507 |
| 4,837,435 | 6/1989 | Sakuhara et al. | 250/306 |

OTHER PUBLICATIONS

Scanning tunneling microscope combined with a scanning electron microscope G. Binnig et al; Feb. 1986, pp. 221–224.

Near-field optical–scanning microscopy U. Durig et al; May 15, 1986 pp. 3318–3327.

*Primary Examiner*—Bruce C. Anderson
*Attorney, Agent, or Firm*—Cushman, Darby & Cushman

[57] ABSTRACT

A microscope apparatus includes a microscope body having a mounting section. An observation unit is removably fitted to the mounting section, and includes an objective lens unit and a tip unit. The lens unit has an objective lens opposed to an observation surface and forms an optical image of the surface viewable through the microscope body. The tip unit includes a support member attached to the mounting section, and a glass plate supported by the support member to be located between the objective lens and the observation surface. A fine conductive tip is fixed to the glass plate and extends therefrom toward the observation surface, in the direction of an optical axis of the objective lens. A piezoelectric section for shifting the glass plate is fixed to the support member.

39 Claims, 6 Drawing Sheets

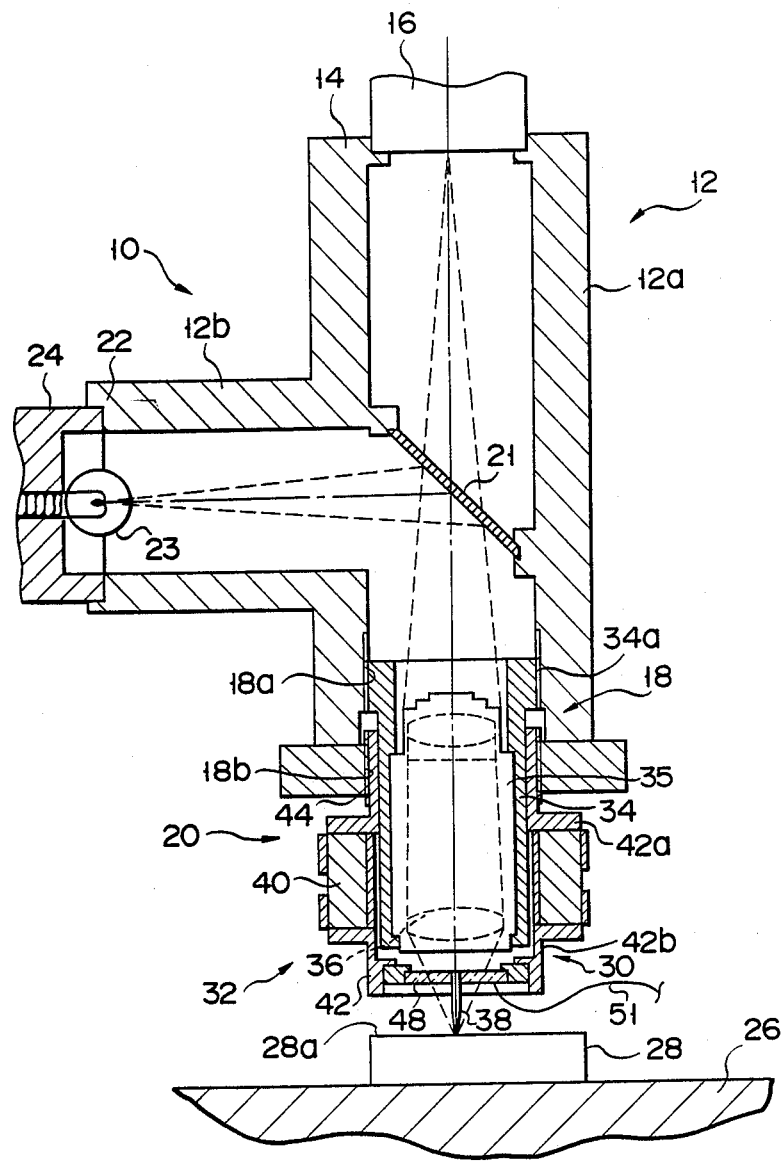
F I G. 1

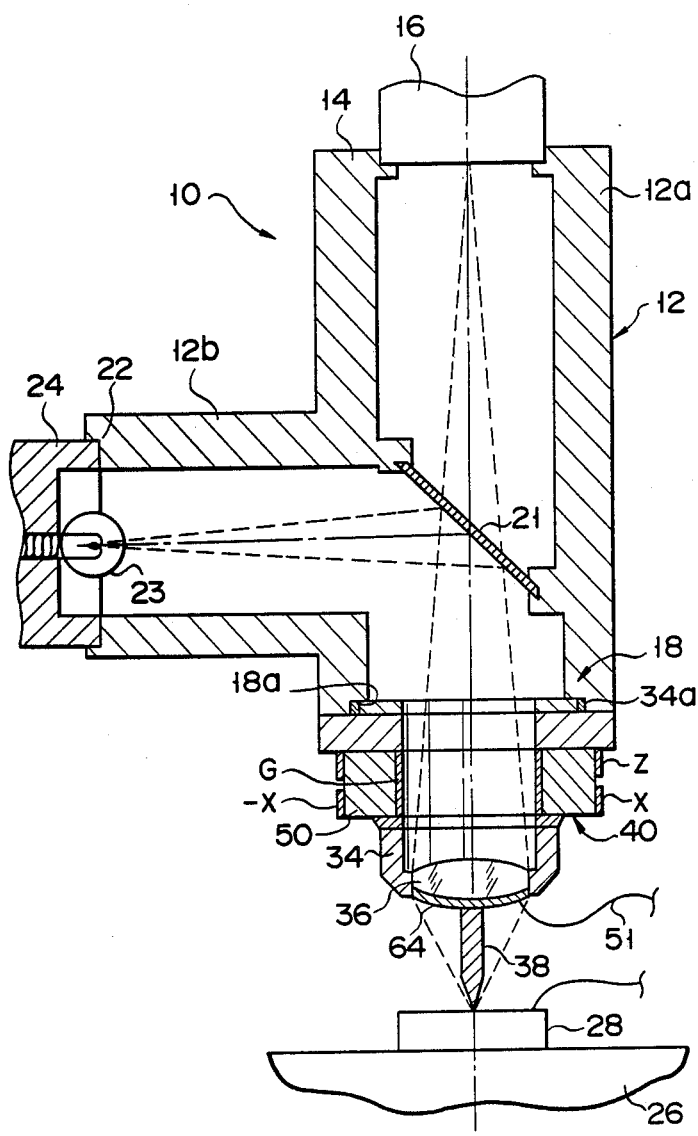
F I G. 10

MICROSCOPE APPARATUS

BACKGROUND OF THE INVENTION

1. Field of the Invention

The present invention relates to a microscope apparatus for observing finely detailed objects such as semiconductor structures.

2. Description of the Related Art

A high-resolution scanning tunnel microscope (hereinafter referred to as an STM) has recently been developed for the observation of finely detailed objects. The STM has a resolution high enough to enable observation of, for example, atoms, and comprises a tip which is attached to a microscope body. For observation of a sample, the tip is placed approximately 1 $\mu$m from the sample to be observed, so that electron clouds of the atoms of the distal end of the tip and those of the sample overlap one another, and a tunnel current is then caused to flow between the tip and the sample when a voltage is applied between them. Since the value of the tunnel current changes exponentially in accordance with the distance between the tip and the sample, therefore the STM utilizes the relationship between tunnel current and distance for observation of the sample. More specifically, the STM two-dimensionally scans the surface of the sample by means of the tip, measuring the size of the tunnel current at various measuring points on the sample surface. Based on the measured values of the tunnel current, the distance between the tip at each measuring point and the sample of observation is superaccurately measured, and the measured values of distance at the individual measuring points are plotted to obtain a three-dimensional image of the sample surface. However, in actual measurements, it is difficult to detect the distance between the tip and the sample with high accuracy. Generally, therefore, the tip is moved up and down for tracing the irregular configuration of the sample surface with two-dimentionally scanning the sample surface, so that the distance between the surface and the tip, and the tunnel current are constant. The three-dimensional image of the sample surface is obtained on the basis of the amount of the up-and-down motion of the tip.

The observation area of the above STM usually ranges from tens of nanometers square to about 1 $\mu$m square. Thus, if the whole observation surface of the sample is substantially even, as in the case of observing regularly oriented atoms, for example, a desired observation image can be obtained at any region of the sample surface. In this case, therefore, the observation region need not be specially chosen. On the other hand, if the configuration of the observation surface is irregular, as in the case of observing the profile of a semiconductor device formed of a wafer carrying thereon a linear pattern 1 $\mu$m wide and 0.4 $\mu$m high, for example, the tip must be accurately located in a specified place for observation. However, the conventional STM cannot attain this.

Accordingly, an improved apparatus has been developed which combines an STM with a scanning electron microscope (SEM). However, since the SEM is designed for observation of a sample in a vacuum, this apparatus cannot be used for observation in the atmosphere or in water.

In another improved apparatus developed hitherto, an optical microscope is arranged diagonally behind an STM, and the tip of the STM is positioned at a desired observation region of the surface of a sample to be observed while the tip and the sample are being observed by the optical microscope. The optical microscope, however, is designed for diagonal observation of a sample from behind, so that it is difficult to obtain high magnifying power and it is difficult to accurately observe the relationship between the tip and the sample surface by the optical microscope. Thus, the tip cannot be accurately positioned with respect to the sample of observation.

SUMMARY OF THE INVENTION

The present invention has been developed in consideration of the above-described circumstances, and has as its object to provide a microscope apparatus which is capable of accurately positioning a tip at a specified location for observation, and which enables accurate high-magnification observation of the structure of the object being observed.

In order to achieve the above object, an apparatus according to the present invention comprises: a microscope body; objective optical means including attached to the body and having an objective lens facing an observation surface of a sample to be observed, for forming an optical image of the observation surface viewable through the body; a fine conductive tip; support means for supporting the tip substantially parallel to an optical axis of the objective lens, within a region between the objective lens and the observation surface; shift means for shifting the tip and the sample relative to each other; means for applying a voltage between the sample and the tip so that a fine tunnel current flows between the sample and the tip; and means for measuring the fine tunnel current while the sample and the tip shift are shifted relative to each other.

According to the apparatus constructed in this manner, the tip can be accurately positioned at a specified location of a sample to be observed within the field of vision of the optical microscope body, while the sample is being visually observed through the microscope body. On the basis of the tunnel current detected by the tip, a specified region of the sample can be accurately observed while the sample and the tip are being shifted relative to each other.

BRIEF DESCRIPTION OF THE DRAWINGS

FIGS. 1 to 4 show a microscope apparatus according to a first embodiment of the present invention, in which FIG. 1 is a longitudinal sectional view showing a principal part of the apparatus, FIG. 2 is a schematical diagram showing a control circuit for a piezoelectric section, FIG. 3 is a perspective view of the piezoelectric section, and FIG. 4 is a perspective view showing a mounting structure of a tip;

FIGS. 7 and 8 show a microscope apparatus according to a third embodiment of the present invention, in which FIG. 7 is a perspective view showing a principal part of the apparatus, and FIG. 8 is a perspective view of a piezoelectric section;

FIG. 10 is a longitudinal sectional view showing a microscope apparatus according to a fourth embodiment of the invention;

DETAILED DESCRIPTION OF THE PREFERRED EMBODIMENTS

Figure 2:
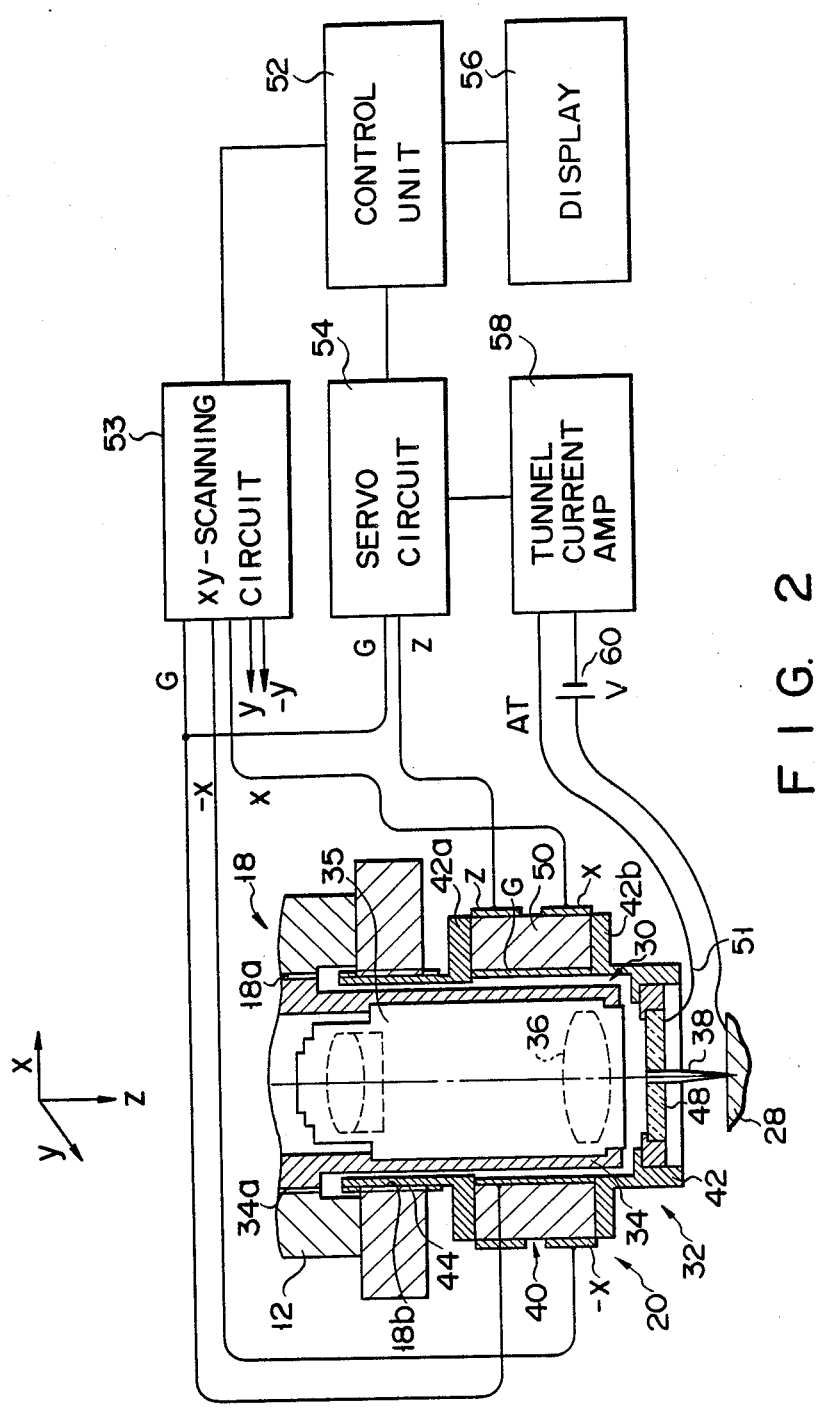

Preferred embodiments of the present invention will now be described in detail, with reference to the accompanying drawings.

FIGS. 1 to 4 show a microscope apparatus according to a first embodiment of the present invention. As is shown in FIG. 1, the apparatus comprises vertical illumination type bright-field optical microscope body 10 which includes substantially T-shaped body tube 12 which has vertical section 12a and horizontal section 12b. Tube 12 is supported, in the state as illustrated, by a supporting mechanism (not shown). Eyepiece section 14 is formed at a top opening portion of vertical section 12a, and industrial television (ITV) camera 16 is mounted on the eyepiece section. Unit mounting section 18 is formed at a bottom opening portion of vertical section 12a, and observation unit 20 (mentioned later) is fitted to the mounting section. Further, half mirror 21 is provided at the middle portion of vertical section 12a. Mounting section 22 is formed at an end opening portion of horizontal section 12b, and illuminator 24 having lamp 23 is mounted on section 22 so as to face mirror 21. Sample stage 26 is positioned opposing the bottom of observation unit 20, at a predetermined distance therefrom.

While the microscope apparatus is in use, a light beam from illuminator 24 is deflected downward by half mirror 21, so as to be incident on observation surface 28a of object 28 placed on sample stage 26. An image of object 28 is transmitted through observation unit 20, to be imaged on the side of eyepiece section 14, so that it can be observed through camera 16.

Observation unit 20 will now be described in detail.

As is shown in FIGS. 1 and 2, observation unit 20 is provided with objective lens unit 30 and tip unit 32. Unit 30 includes cylindrical lens holder 34, in which objective lens optical system 35 is arranged system 35 includes objective lens 36 fixed to the lower end of holder 34. Male screw portion 34a, which is formed at the upper end portion of holder 34, is threaded in female screw portion 18a formed on mounting section 18 of body 10. Thus, unit 30 is removably fitted to section 18 and such that the optical axis of optical system 35 is in alignment with the axis of the light beam from illuminator 24.

Tip unit 32 includes tip 38 (mentioned later), piezoelectric section 40, and support cylinder 42 supporting these two elements. Cylinder 42 has upper and lower cylinders 42a and 42b, between which ring-shaped piezoelectric section 40 is fixed. Male screw portion 44, which is formed at the upper end portion of upper cylinder 42a, is threaded in female screw portion 18b formed on mounting section 18 of body 10. Thus, support cylinder 42 is fitted to section 18 so that it is situated with a gap outside lens holder 34, and its position can be independently adjusted along the optical axis of optical system 35. Female screw portions 18a and 18b of mounting section 18 have the same diameter.

Figure 4:
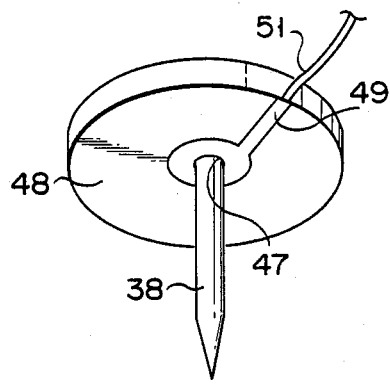

A light transmitting member, e.g., glass plate 48, is fixed to the bottom opening of lower cylinder 42b so as to be situated under objective lens 36, at right angles to the optical axis of optical system 35. Tip 38 is fixed to plate 48. Tip 38 is formed by sharpening the distal end of a tip of tungsten or platinum, with a length of several millimeters to tens of millimeters and a diameter of several millimeters or less, for example, to a diameter of 0.1 μm or less by electrolytic polishing or machining (grinding). Extending parallel to the optical axis of optical system 35, tip 38 is fixed to glass plate 48 in a manner such that its proximal end portion penetrates the glass plate. In this embodiment, in particular, tip 38 is coaxial with the optical axis of system 35. Thus, support cylinder 42 and glass plate 48 constitute support means for supporting tip 38. As is shown in FIG. 4, moreover, conduction passage 49, made of conductive thin film of e.g. gold or platinum, is formed on the underside of plate 48. The inner end portion of passage 49 is connected to tip 38 by means of conductive bonding agent 47, which is used for fixing the tip to glass plate 48. One end of lead wire 51 is connected to the outer end portion of passage 49. Since tip 38 is thus fixed to glass plate 48 between object 28 and objective lens 36, the sample and the tip can be viewed from right above, through plate 48, by means of objective optical system 35 and camera 16.

Figure 3:
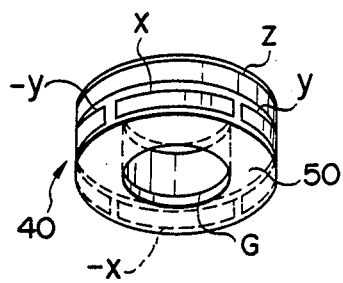

Piezoelectric section 40 of tip unit 32 constitutes part of relative position shifting means which finely moves tip 38, along with lower cylinder 42b and glass plate 48, in the directions of the x-axis, y-axis, and Z-axis (along the optical axis of optical system 35 or the axis of the tip), thereby finely shifting the relative positions of object 28 of observation and the tip. As is shown in FIG. 3, piezoelectric section 40 is formed of a tube scanner in which electrode G is pasted on the inner circumferencial surface of cylindrical piezoelectric ceramics 50, while electrodes x, y, −x, −y and Z are pasted on the outer circumferencial surface of the ceramics. The shifting means includes control unit 52 for controlling the operation of piezoeectric section 40. Unit 52 includes, for example, a microcomputer and peripheral circuits associated therewith. The control unit is connected with xy-scanning circuit 53, servo circuit 54, and display 56. Scanning circuit 53 is connected with electrodes G, x, y, −x and −y of piezoelectric section 40. Moreover, servo circuit 54 is connected with electrodes G and Z and tunnel current amplifier 58. Amplifier 58 is connected to conduction passage 49 on glass plate 48, and is also connected to object 28 on sample stage 26 through power source 60. In this case, xy-scanning circuit 53 serves particularly as a control circuit which supplies piezoelectric section 40 with x- and y-scanning voltages for scanning tip 38 in the x- and y-axis directions. When voltage V of tens to hundreds of millivolts is applied between object 28 and tip 38, amplifier 58 detects and amplifies a fine voltage flowing between the two, that is, tunnel current AT. Further, servo circuit 54 supplies piezoelectric section 40 with a feedback voltage, which shift tip 38 in the Z-axis direction so as to keep detected current AT constant. Control unit 52 receives the x- and y-scanning voltages and the Z-axis feedback voltage through an interface (not shown) or the like, and processes information on the regularity of the surface of object 28 in accordance with the values of the input voltages. Display 56, which has a CRT or the like, having an image memory for density indication, an xy plotter, etc., serves to indicate the information processed by control unit 52, that is, the regularity of the sample surface.

The following is a description of the operation of the microscope apparatus constructed in this manner.

First, observation unit 20 is fitted to mounting section 18 of body 10, and amplifier 58 is connected to object 28 of observation through power source 60. Then, object 28 is set on sample stage 26. In this state, stage 26 is raised to bring observation surface 28a of object 28 close to tip 38 of unit 20, and objective optical system 35 is focused on surface 28a while observing the image photographed by means of ITV camera 16. In doing this, support cylinder 42 of tip unit 32 is previously rotated to adjust the position of tip 38 relative to objective lens 36, so that the region (focal depth of STM) for the tunnel current detection by means of the tip is within the range of the focal depth of optical system 35. In general, the focal depth of the optical system of body 10 varies depending on illuminator 24 and optical magnification. If the optical magnification is 100, for example, the focal depth is several micrometers or less. If the magnification is 40, the focal depth is tens of micrometers or less. As compared with this, the detectable region for the tunnel current is approximately 1 nm, which is about 1/10,000 to 1/1,000 of the focal depth of the optical system. Thus, the region for the tunnel current detection by means of tip 38 can be easily set within the range of the focal depth of optical system 35.

Subsequently, object 28 is moved in the x- and y-axis directions while observing the image of surface 28a of the sample photographed by means of ITV camera 16. By doing this, that portion of the sample which is to be observed by means of tip 38 is situated in the central portion of a field of vision of body 10 or in a predetermined setting position. In this state, a voltage is applied between electrodes G and Z of piezoelectric section 40, thereby shifting tip 38 in the Z-axis direction, so that distal end of the tip is placed at about 1 nm from object surface 28a.

When the voltage is applied to electrodes G and Z, piezoelectric section 40 is shifted in the Z-axis direction, so that tip 38 can be shifted together with section 40, in the Z-axis direction. Likewise, in shifting tip 38 in the x-axis direction, voltages $+Vx$ and $-Vx$ are applied between electrodes G and x of section 40 and between electrodes G and $-x$, respectively. In finely moving tip 38 in the direction $-x$, moreover, voltages $-Vx$ and $+Vx$ are applied between electrodes G and x and between electrodes G and $-x$, respectively. Tip 38 can be shifted in the y-axis direction in like manner.

Thus, tip 38 can be shifted independently in the x-, y-, and Z-axis directions by applying the voltages to electrodes G, x, y, $-x$, $-y$ and Z of piezoelectric section 40, and the surface of object 28 to be observed can be observed through the STM.

According to the microscope apparatus constructed in this manner, observation unit 20, mounted on mounting section 18 of microscope body 10, includes objective optical system 35, tip 38 for fine current detection, and piezoelectric section 40 for shifting object 28 and tip 38 relative to each other. Thus, while visually observing object 28 through optical microscope body 10, tip 38 can be accurately positioned in a specified place for observation within the field of vision of body 10. On the basis of a fine tunnel current detected by means of tip 38, a specified region of object surface 28a can be accurately observed while the relative positions of object 28 and tip 38 are being shifted in this state. Even though the configuration of the sample surface, like the profile of a semiconductor, varies depending on the place of observation, therefore, tip 38 can be easily positioned at the specified observation place with high accuracy. Accordingly, the operating efficiency, compared to that of a conventional STM, can be considerably improved.

Tip unit 32 of observation unit 20 is located outside objective lens unit 30 with objective optical system 35 so as to cover the lens unit. Therefore, object 28 of observation can be observed even when it is in the atmosphere, water, or liquid nitrogen or some other liquid. Thus, the fine structure of object 28 can be observed more easily with higher magnifying power and accuracy than in the case where an STM and SEM are combined so that the environment of observation is restricted to a vacuum. Unlike the combination of the STM and SEM, moreover, the arrangement of this embodiment does not require use of any expensive equipment for evacuation, so that the total cost of the apparatus can be reduced. Since the time for evacuation can be saved, furthermore, the time for the observation of object 28 can be shortened.

In observation unit 20, tip unit 32, having tip 38 and piezoelectric section 40 for finely moving the tip, is formed separately from objective lens unit 30 which includes objective optical system 35, and is independently mounted on body 10. Even though tip 38 is finely moved, therefore, optical system 35 and an optical image formed thereby can be prevented from moving. Thus, the optical image can be satisfactorily viewed during the operation. Moreover, only tip 38, glass plate 48, and lower support cylinder 42b are adapted to be finely moved by means of piezoelectric section 40, and objective optical system 35 is not. Accordingly, the mass of those parts to be finely moved by section 40 is relatively small. In consequence, piezoelectric section 40 is improved in frequency characteristic, and the position of tip 38 can be finely adjusted with ease.

If there occurs trouble, such as bending of tip 38, during the observation, it is necessary only that the tip and glass plate 48 be replaced. Thus, the replacement work can be easily achieved at low cost.

Since observation unit 20 is formed as an independent unit including objective lens unit 30 and tip unit 32, moreover, the STM may be obtained by mounting the observation unit, in place of the conventional objective lens unit, on the objective lens mounting section of a conventional optical microscope. In this embodiment, furthermore, tip unit 32 is formed independently of objective lens unit 30, so that the STM may alternatively be obtained by mounting the tip unit, as well as the conventional objective lens unit, on the objective lens mounting section of a conventional optical microscope.

The present invention is not limited to the embodiment described above, and various changes and modifications may be effected therein by one skilled in the art without departing from the scope or spirit of the invention.

Figure 5:
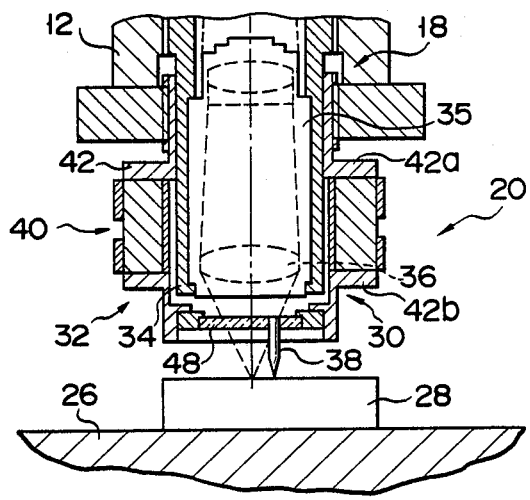
FIG. 5 is a longitudinal sectional view showing a principal part of a microscope apparatus according to a second embodiment of the present invention.

For example, tip 38 must only be arranged substantially parallel to the optical axis of objective optical system 35, within the field of vision thereof, and may be fixed to glass plate 48 so that it is eccentric to the optical axis of system 35, as is shown in FIG. 5. In this case, tip 38 can be prevented from intercepting the illumination light from illuminator 24 and darkening the image observed through optical microscope body 10.

Figure 6:
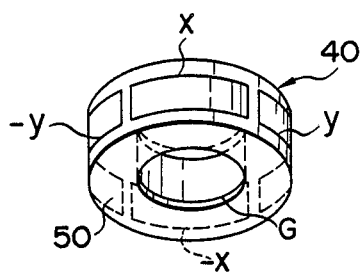
FIG. 6 is a perspective view showing first modification of the piezoelectric section.

As in a modification shown in FIG. 6, moreover, piezoelectric section 40 may alternatively be formed of a tube scanner in which electrode G is pasted on the inner circumferential surface of cylindrical piezoelectric ceramics 50, while electrodes x, y, −x, and −y are pasted on the outer circumferencial surface of the ceramics. In this case, section 40 can be shifted in the Z-axis direction by only applying voltage Vz between electrodes G and x, between G and −x, between G and y, and between G and −y. In order to shift the piezoelectric section in the x- and y-axis directions, the voltages are applied in the same manner as in the case of the first embodiment.

Figure 7:
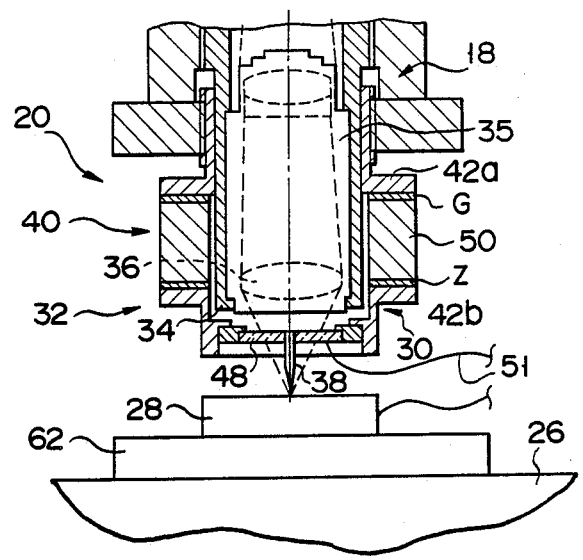
Figure 8:
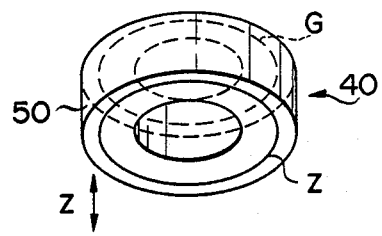

FIGS. 7 and 8 show a microscope apparatus according to a third embodiment of the present invention. According to this embodiment, piezoelectric section 40 is formed of a tube scanner of a vertical-effect type in which electrodes G and Z are pasted on the top and bottom surfaces, respectively, of cylindrical piezoelectric ceramics 50, and tip 38 is finely moved only in the Z-axis direction. Further, xy-direction drive mechanism 62 is mounted on sample stage 26, and object 28 is paced on mechanism 62. In this arrangement, object 28 is scanned in the x- and y-axis directions by means of drive mechanism 62. In this case, the scanning area or observation area of the STM can be much wider than in the case where tip 38 is moved for scanning in the x- and y-axis directions by means of the tube scanner.

Figure 9:
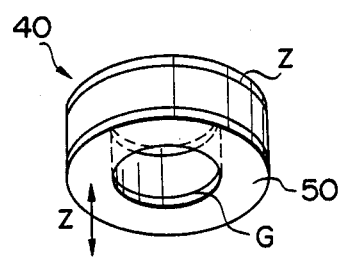
FIG. 9 is a perspective view showing a second modification of the piezoelectric section.

In the third embodiment, piezoelectric section 40 may be formed of a tube scanner of a horizontal-effect type, as is shown in FIG. 9, in place of the vertical-effect tube scanner. In this case, electrodes G and Z are pasted on the inner and outer circumferential surfaces, respectively, of cylindrical piezoelectric ceramics 50, and tip 38 is finely moved only in the Z-axis direction.

In the third embodiment, piezoelectric section 40 is constructed so art finely move tip 38 only in the Z-axis direction. Alternatively, however, the tip may be finely moved in the Z- and x-axis directions or in the Z- and y-axis directions by section 40. Moreover, the piezoelectric section may be omitted. In this case, a mechanism for driving object 28 of observation in the x-and y-axis directions must be mounted on sample stage 26.

FIG. 10 shows a microscope apparatus according to a fourth embodiment of the present invention. This embodiment differs from the first embodiment in the arrangement of observation unit 20. As regards the arrangement of the other components, the fourth embodiment is the same as the first embodiment. In the description to follow, like reference numerals are used to designate like portions throughout the drawings, and a detailed description of those portions is omitted.

In the fourth embodiment, an objective lens unit and a tip unit of observation unit 20 are formed integrally with each other. More specifically, unit 20 includes lens holder 34, which supports all of objective lens 36, tip 38, and piezoelectric section 40.

Objective lens 36 of an objective optical system is fixed in a bottom opening of holder 34. Male screw portion 34a, which is formed at the upper end portion of holder 34, is threaded in female screw portion 18a formed on mounting section 18 of body 10. Thus, holder 34 is removably mounted on section 18 so that the optical axis of optical lens 36 is in alignment with that of the light from illuminator 24. The intermediate portion of holder 34 is formed of ring-shaped piezoelectric section 40. Section 40, which is formed in the same manner as in the first embodiment, is connected to a control section through an xy-operation circuit, a servo circuit, and a tunnel current amplifier (not shown).

Electrically conductive film 64 is formed on the whole lower or outer surface of objective lens 36, which faces object 28. Tip 38 for fine current detection is fixed to the center of the lower surface of lens 36. Having its proximal end fixed to film 64 by brazing or bonding, for example, tip 38 extends coaxially with the optical axis of the objective lens. Conductive film 64, which transmits light, is formed by, for example, depositing a conductive material, such as gold, to a thickness of hundreds of angstroms by sputtering. As film 64 is connected to the power supply by means of lead wire 51, a voltage is applied between tip 38 and object 28. In this embodiment, objective lens 36 constitutes the support means for supporting tip 38.

According to the apparatus with the construction described above, tip 38 can be shifted independently in the x-, y-, and Z-axis directions by applying voltages to electrodes G, x, y, −x, −y of piezoelectric section 40, and the surface of object 28 of observation can be observed through the STM. In this embodiment, moreover, objective lens 36 is shifted integrally with tip 38 as section 40 shifts its position. Accordingly, an image of object 28 observed through camera 16 finely moves. This fine movement, however, ranges from only tens to hundreds of micrometers. By suitably adjusting the magnification of the optical system, the amount of the fine movement can be reduced to a level about 1/10 to 1/100 of the entire field of vision of microscope body 10. Therefore, the image of object 28 can be prevented from being extremely blurred and becoming unobservable.

Also in the fourth embodiment constructed in this manner, as in the first embodiment, tip 38 can be accurately positioned at a specified observation region of the surface of object 28, while observing the sample through microscope body 10. In other respects, moreover, this embodiment provides substantially the same advantages of the first embodiment.

In the fourth embodiment, conductive film 64 is formed over the whole lower surface of objective lens 36. Alternatively, however, the film may be in the form of a belt extending from tip 38 to the peripheral edge of lens 36.

Figure 11:
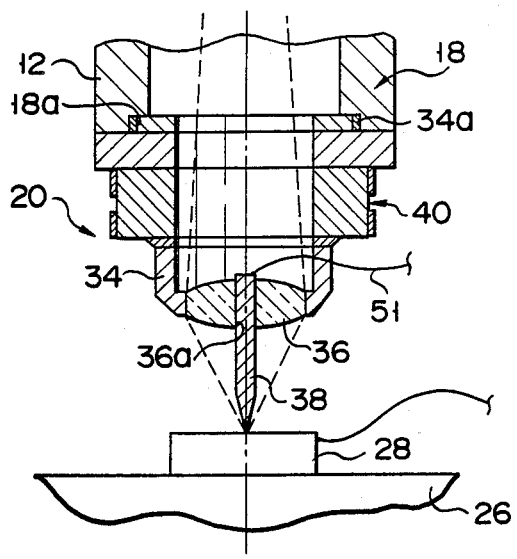
FIG. 11 is a longitudinal sectional view showing a principal part of a microscope apparatus according to a fifth embodiment of the invention.

In a fifth embodiment shown in FIG. 11, through hole 36a is bored through objective lens 36, and the proximal end portion of tip 38 is passed through the hole and bonded thereto. The proximal end of tip 38, which projects upward from the objective lens, is connected to a tunnel current amplifier through lead wire 51. According to this arrangement, the supporting structure for tip 38 is improved in strength, and conductive film 64 on the outer surface of lens 36 may be omitted.

Alternatively, moreover, the conductive film may be formed on the inner surface of objective lens 36 so that the end portion of tip 38 projecting inside the lens is connected to the film.

Figure 12:
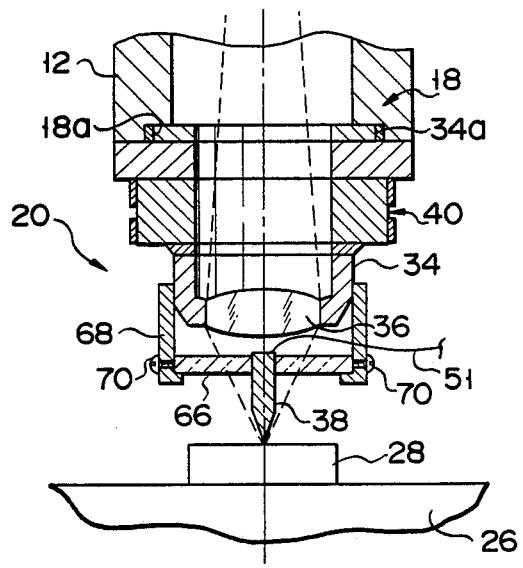
FIG. 12 is a longitudinal sectional view showing a principal part of a microscope apparatus according to a sixth embodiment of the invention.

In the fourth and fifth embodiments described above, tip 38 is fixed directly to objective lens 36. As is shown in FIG. 12, however, the tip may be fixed to glass plate 66 which is independent of lens 36. More specifically, in the arrangement of FIG. 12, a top opening portion of substantially cylindrical tip retaining member 68 is removably fitted on the lower end portion of lens holder 34 which holds objective lens 36. Glass plate 66 is fixed inside a bottom opening portion of member 68, so as to be situated at right angles to the optical axis of lens 36, between object 28 and the lens. Plate 66 is attached to retaining member 68 for position adjustment with respect thereto, by means of a plurality of adjusting screws 70 threaded in member 68 in the radial direction thereof. Having its proximal end portion fixed to the center of glass plate 66, tip 38 extends coaxially with the optical axis of objective lens 36. The proximal end portion of the tip fixedly penetrates plate 66.

According to the apparatus constructed in this manner, tip 38 is fixed to the glass plate which is independent of objective lens 36, instead of being fixed directly to the lens. Therefore, lens 36 itself need not be specially worked, so that the manufacture can be simplified. If there occurs trouble, such as bending of tip 38, during measurement by means of STM, it is necessary only that glass plate 66, with the tip thereon, be replaced. Thus, the replacement work can be achieved more easily than in the case where the whole objective lens must be replaced. Since the proximal end portion of tip 38 fixedly penetrates plate 66, moreover, the tip has improved mounting strength.

Further, adjusting screws 70 are used to adjust the mounting position of glass plate 66, so that tip 38 can be aligned with the optical axis of objective lens 36 by simple adjustment work. Also, setting the distal end portion of tip 38 within the focal plane of the optical system or in any other suitable position can be facilitated.

In the various embodiments described herein, optical microscope body 10 is not limited to the bright-field optical microscope of the vertical illumination type, and may alternatively be a dark-field optical microscope or a Nomarski interference microscope. It is to be understood that various other changes and modifications may be effected in the present invention by one skilled in the art without departing from the scope or spirit of the invention.

What is claimed is:

1. A microscope apparatus for observing an observation surface of a sample by utilizing the tunnel effect, comprising:
   a microscope body;
   objective optical means attached to the body and including an objective lens facing the observation surface, for forming an optical image of the observation surface viewable through the body;
   a fine conductive tunneling tip;
   support means for supporting the tip substantially parallel to an optical axis of the objective lens, within a region between the objective lens and the observation surface;
   shift means for shifting the tip and the sample relative to each other;
   means for applying a voltage between the sample and the tip so that a fine tunnel current flows between the sample and the tip; and
   means for measuring the fine tunnel current while the sample and the tip shift are shifted relative to each other.

2. An apparatus according to claim 1, wherein said support means includes a light transmitting member located between the sample and the objective lens so as to face the objective lens, and said tip is fixed to the light transmitting member so as to extend therefrom toward the observation surface.

3. An apparatus according to claim 2, wherein said tip is coaxial with the optical axis of the objective lens.

4. An apparatus according to claim 2, wherein said tip is eccentric to the optical axis of the objective lens.

5. An apparatus according to claim 2, wherein said light transmitting member includes a glass plate situated at right angles to the optical axis of the objective lens.

6. An apparatus according to claim 2, wherein said tip has a proximal end portion fixedly inserted in the light transmitting member.

7. An apparatus according to claim 2, wherein said support means includes a substantially cylindrical support member surrounding the objective lens, the support member having one end portion attached to the body and the other end portion supporting the light transmitting member.

8. An apparatus according to claim 7, wherein said support member includes means for adjusting the position of the tip relative to the optical axis of the objective lens.

9. An apparatus according to claim 8, wherein said adjusting means includes a plurality of adjusting screws used to fix the light transmitting member to the support member, each of said screws being threaded into the support member, in a direction perpendicular to the optical axis of the objective lens.

10. An apparatus according to claim 7, wherein said support member is removably attached to the body, for movement in the direction of the optical axis of the objective lens.

11. An apparatus according to claim 10, wherein said body includes a mounting section, on which the optical means is mounted, and a first screw portion formed on the mounting section, and said support member includes a second screw portion formed on said one end portion thereof and engaging the first screw portion.

12. An apparatus according to claim 11, wherein said body includes a body tube having the mounting section, and a substantially cylindrical lens holder containing the optical means therein and removably mounted on the mounting section, the lens holder being passed through the support member.

13. An apparatus according to claim 7, wherein said shift means includes a piezoelectric section attached to the support member and shiftable in a predetermined direction, integral with the light transmitting member.

14. An apparatus according to claim 13, wherein said piezoelectric section is shiftable in the direction of the optical axis of the objective lens, a first direction perpendicular to the optical axis, and a second direction perpendicular to the optical axis and the first direction, and said shift means includes second voltage applying means for applying a predetermined voltage to the piezoelectric section.

15. An apparatus according to claim 13, wherein said piezoelectric section is shiftable in the direction of the optical axis of the objective lens, and said shift means includes second voltage applying means for applying a predetermined voltage to the piezoelectric section and a drive mechanism for shifting the sample in a first direction perpendicular to the optical axis and a second direction perpendicular to the optical axis and the first direction.

16. An apparatus according to claim 13, wherein said support member includes a first portion attached to the body and a second portion supporting the light transmitting member, and said piezoelectric section is fixed between the first and second portions so as to surround the optical means.

17. An apparatus according to claim 7, wherein said body includes a body tube having a mounting section, and a substantially cylindrical lens holder containing the optical means therein and removably mounted on the mounting section, and said one end portion of the support member is removably attached to the lens holder.

18. An apparatus according to claim 17, wherein said shift mean includes a piezoelectric section attached to the lens holder and shiftable in predetermined mined direction, integral with the light transmitting member.

19. An apparatus according to claim 1, wherein said tip is fixed to the objective lens and extends therefrom toward the sample, and said objective lens constitutes the support means.

20. An apparatus according to claim 19, wherein said tip is coaxial with the optical axis of the objective lens.

21. An apparatus according to claim 19, wherein said objective lens has a surface which opposes to the sample and on which an electrically conductive film is formed, and said tip is fixed to the objective lens through the conductive film, and is connected to the voltage applying means by means of the conductive film.

22. An apparatus according to claim 19, wherein said objective lens has a through hole extending in the direction of the optical axis thereof, and said tip has a proximal end portion passed through the through hole and fixed to the objective lens.

23. An apparatus according to claim 19, wherein said optical means includes a lens holder holding the objective lens and mounted on the body, and said shift means includes a piezoelectric section fixed to the lens holder and shiftable in a predetermined direction, integral with the objective lens.

24. An apparatus according to claim 23, wherein said piezoelectric section is shiftable in the direction of the optical axis of the objective lens, a first direction perpendicular to the optical axis, and a second direction perpendicular to the optical axis and the first direction, and said shift means includes second voltage applying means for applying a predetermined voltage to the piezoelectric section.

25. An apparatus according to claim 23, wherein said lens holder is removably mounted on the body.

26. An observation apparatus for observing an observation surface of a sample by utilizing the tunnel effect, in combination with an optical microscope having a mounting section designed to be fitted with objective optical means, said apparatus comprising:
a an objective lens unit removably mounted on the mounting section, the lens unit including an objective optical system having an objective lens opposed to the observation surface, and designed to form an optical image of the observation surface viewable through the optical microscope;
a tip unit removably mounted on the mounting section and surrounding the objective lens unit, the tip unit including a light transmitting member located between the objective lens and the observation surface, a fine conductive tunneling tip fixed to the light transmitting member and extending therefrom toward the observation surface, in the direction of an optical axis of the objective lens, and shift means for shifting the light transmitting member in a predetermined direction; and
means for applying a voltage between the sample and the tip so that a fine tunnel current flows between the sample and the tip.

27. An apparatus according to claim 26, wherein said objective lens unit includes a substantially cylindrical lens holder containing the optical system therein and having one end portion removably mounted on the mounting section, and said tip unit includes a substantially cylindrical support member arranged substantially coaxial with the lens holder, outside the holder, the support member having one end portion removably attached to the mounting section, and the other end portion supporting the light transmitting member.

28. An apparatus according to claim 27, wherein said support member is mounted on the mounting section, for movement in the direction of the optical axis of the objective lens.

29. An apparatus according to claim 27, wherein said shift means includes a piezoelectric section attached to the support member and shiftable in a predetermined direction, integral with the light transmitting member.

30. An apparatus according to claim 29, wherein said piezoelectric section is shiftable in the direction of the optical axis of the objective lens, a first direction perpendicular to the optical axis, and a second direction perpendicular to the optical axis and the first direction, and said shift means includes second voltage applying means for applying a predetermined voltage to the piezoelectric section.

31. An apparatus according to claim 29, wherein said support member includes a first portion attached to the mounting section, and a second portion supporting the light transmitting member, and said piezoelectric section is fixed between the first and second portions so as to surround the optical system.

32. An apparatus according to claim 26, wherein said tip is coaxial with the optical axis of the objective lens.

33. A tip unit for observing an observation surface of a sample by utilizing the tunnel effect, in combination with an optica microscope having a mounting section designed to be fitted with an objective lens unit which includes an objectivelens opposed to the observation surface, said tip unit comprising:
a support member removably mounted on the mounting section and surrounding the objective lens unit;
a light transmitting membermounted on the support member and situated between the objective lens and the observation surface;
a fine conductive tunneling tip fixed to the light transmitting member and extending the refrom toward the observation surface, in the direction of an optical axis of the objective lens; and
shift means fixed to the support member, for shifting the light transmitting member in a predetermined direction.

34. An observation apparatus for observing an observation surface of a sample by utilizing the tunnel effect, in cooperation with an optical microscope having a mounting section designed to be fitted with objective optical means, said apparatus comprising:
a support member removably mounted on the mounting section;
an objective optical system held by the support member and designed to form an optical image of the observation surface viewable through the optical microscope, the optical system including an objective lens opposed to the observation surface;

a fine conductive tunneling tip fixed to the objective lens and extending therefrom toward the observation surface, in the direction of an optical axis of the objective lens; and shift means mounted on the support member for shifting and designed to shift the objective lens and the tip in a predetermined direction.

35. An apparatus according to claim 34, wherein said tip is coaxial with the opttical axis of the objective lens.

36. An apparatus according to claim 34, wherein said objective lens has a surface which opposes to the sample and on which an electrically conductive film is formed, and said tip is fixed to the objective lens through the conductive film.

37. An apparatus according to claim 34, wherein said objective lens has a through hole extending in the direction of the optical axis thereof, and said tip has a proximal end portion passes through the through hole and fixed to the objective lens.

38. An apparatus according to claim 34, wherein said shift means includes a piezoelectric section shiftable in a predetermined direction, integral with the objective lens.

39. An apparatus according to claim 38, wherein said piezoelectric section is shiftable in the direction of the optical axis of the objective lens, a first direction perpendicular to the optical axis, and a second direction perpendicular to the optical axis and the first direction.

* * * * *